United States Patent
Panella et al.

(10) Patent No.: US 8,667,731 B2
(45) Date of Patent: Mar. 11, 2014

(54) SUCTION TRAP FOR COLLECTING RESTING MOSQUITOES

(75) Inventors: Nicholas A. Panella, Fort Collins, CO (US); Rebekah J. Kent, Windsor, CO (US); Nicholas Komar, Fort Collins, CO (US)

(73) Assignee: The United States of America as represented by the Secretary of the Department of Health and Human Services, Centers for Disease Control and Prevention, Atlanta, GA (US)

( * ) Notice: Subject to any disclaimer, the term of this patent is extended or adjusted under 35 U.S.C. 154(b) by 306 days.

(21) Appl. No.: 12/813,279

(22) Filed: Jun. 10, 2010

(65) Prior Publication Data

US 2010/0319240 A1 Dec. 23, 2010

(51) Int. Cl.
*A01M 1/06* (2006.01)
*A01M 1/10* (2006.01)
*A01M 1/02* (2006.01)

(52) U.S. Cl.
USPC .............................. 43/139; 43/107

(58) Field of Classification Search
USPC .......................... 43/139, 113, 107
IPC .............. A01M 1/00,1/02, 1/06, 1/08
See application file for complete search history.

(56) References Cited

U.S. PATENT DOCUMENTS

| | | | | |
|---|---|---|---|---|
| 1,482,420 A | * | 2/1924 | Wilson | 43/113 |
| 1,819,551 A | * | 8/1931 | Gourdon | 43/113 |
| 2,384,930 A | | 9/1945 | Kendrick | |
| 2,893,161 A | | 7/1959 | Reid | |
| 3,214,861 A | | 11/1965 | Arther | |
| 3,796,001 A | * | 3/1974 | Jackson | 43/113 |
| 3,987,578 A | * | 10/1976 | Rueff | 43/139 |
| 4,607,451 A | * | 8/1986 | Jarecki | 43/139 |
| 4,733,495 A | * | 3/1988 | Winnicki | 43/139 |
| 5,305,495 A | * | 4/1994 | Nelsen et al. | 15/414 |
| 6,226,919 B1 | * | 5/2001 | Septer | 43/139 |
| 2005/0155277 A1 | * | 7/2005 | Bagnall et al. | 43/113 |
| 2007/0169403 A1 | * | 7/2007 | Collins | 43/139 |

OTHER PUBLICATIONS

Frommer Updraft Gravid Trap, John W. Hock Company, printed from internet on May 28, 2010, http://www.johnwhock.com/products/1719.htm, 1 page.
Michigan Mosquito Manual: MMCA Edition, Jun. 2002, 38-39.

* cited by examiner

*Primary Examiner* — Darren W Ark
*Assistant Examiner* — Thien Thanh Pham
(74) *Attorney, Agent, or Firm* — Klarquist Sparkman, LLP

(57) ABSTRACT

A method and apparatus are disclosed that can sample a wide variety of mosquitoes attempting to rest. Because all mosquitoes rest daily, biases of typical mosquito traps are avoided, such as targeted collections of host-seeking mosquitoes or gravid female mosquitoes. A particular advantage is the inclusion of blood-engorged mosquitoes in the resting collections. In one embodiment, the apparatus includes an open-sided pot designed to attract mosquitoes seeking a daytime resting location. The mosquitoes that enter a dark space of the pot are aspirated into a screened collection receptacle by means of a battery-powered fan.

19 Claims, 3 Drawing Sheets

SUCTION TRAP FOR COLLECTING RESTING MOSQUITOES

CROSS REFERENCE TO RELATED APPLICATION

This application claims priority from U.S. Provisional Application No. 61/219,684, filed Jun. 23, 2009, which application is incorporated herein by reference in its entirety.

FIELD

The present invention relates to collecting mosquitoes, and particularly relates to collecting resting mosquitoes.

BACKGROUND

Interest in mosquito ecology and the use of appropriate sampling methods began early in the 19th century with the discovery that mosquitoes could act as vectors of diseases to humans and domestic animals. Resting mosquitoes in houses and animal quarters are typically caught using manual or mechanical aspirators or by knock down spray collections. Historically, the simplest and most widely used aspirator was made of plastic or glass tubing with a piece of mosquito netting taped over one end. Mosquitoes are orally sucked into the aspirator and then gently blown into a suitable storage container. However, the practice of collecting mosquitoes by sucking them into aspirators is no longer permitted due to biosafety concerns. Prolonged inhalation of mosquito scales, dust, and other fine debris may cause or aggravate allergies.

Other types of aspirators include small battery-powered devices where suction is produced by high-speed rotation of a plastic or metal fan or gasoline powered aspirators that create a vacuum designed for sucking mosquitoes into a netted container.

Although a wide variety of traps have been proposed, most have biases towards certain types of mosquitoes, such as mosquitoes in host-seeking mode, only females, only egg-laying females, etc. The objective of sampling resting mosquitoes eliminates most biases, because all mosquitoes, regardless of physiological stage, must rest each day. However, searches for outdoor resting mosquitoes have frequently proved time-consuming and unrewarding. Thus, it is desirable to have a low-cost device for collecting mosquitoes that samples an unbiased cross-section of physiological stages within the adult mosquito population in such a manner to permit quantitative comparisons among samples.

SUMMARY

A method and apparatus are disclosed that can sample a true cross-section of a wide variety of mosquito species, particularly Culex, Anopheles and Culiseta genera. All stages of development are represented in the adult mosquitoes attracted to rest in the apparatus, including the target groups of other popular traps such as host-seeking female mosquitoes (CDC light trap, Mosquito Magnet, BG Sentinel trap) and gravid female mosquitoes (CDC gravid trap, oviposition trap). The apparatus is especially effective relative to other traps for collecting blood-engorged mosquitoes (which are notoriously difficult to collect). The apparatus is adaptable for operation at the ground level or in a vegetation canopy and can be highly portable, durable and inexpensive to operate.

In one embodiment, the trap includes an open-ended pot designed to attract mosquitoes seeking a resting location. The mosquitoes that enter the dark space of the pot are aspirated by a battery-powered fan into a collection receptacle.

The foregoing and other objects, features, and advantages of the invention will become more apparent from the following detailed description, which proceeds with reference to the accompanying figures.

DETAILED DESCRIPTION

Figure 1:
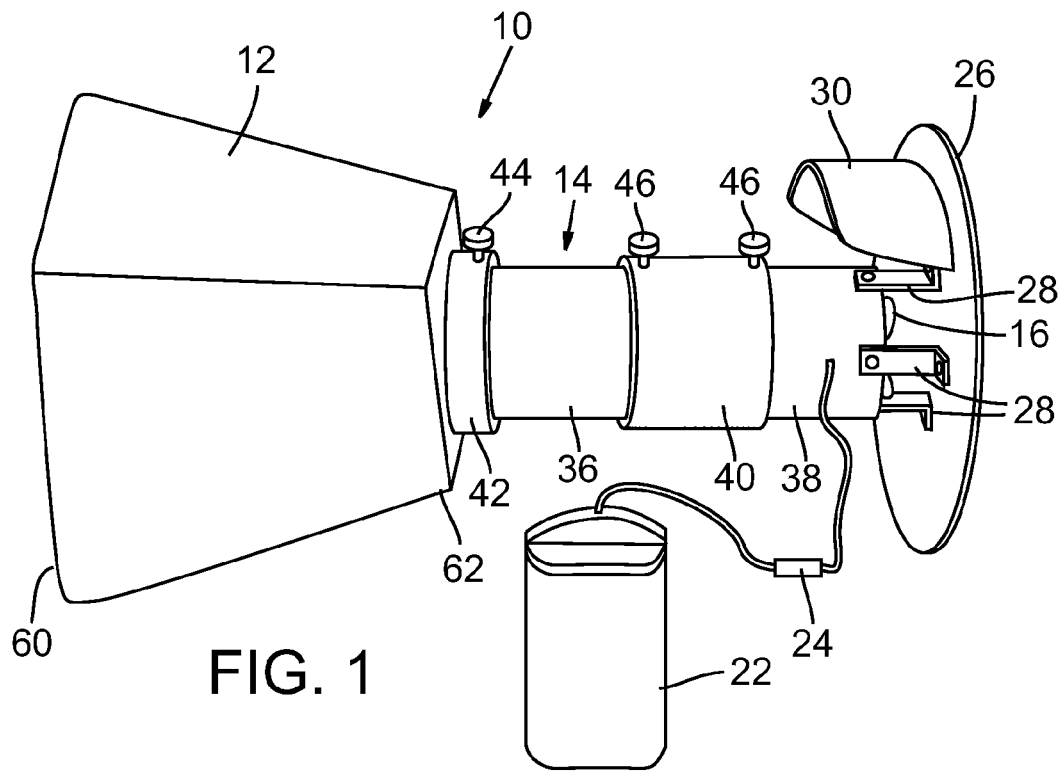
FIG. 1 is a perspective view of a suction trap for collecting resting mosquitoes.

FIG. 1 shows a trap 10 for collecting resting mosquitoes. The trap 10 includes a pot 12 that attracts mosquitoes seeking a resting place. The pot 12 can be made of a variety of materials, such as natural fibers, wood, or plastic. For example, in one embodiment, a wood-fiber pot can be used. The pot can be stackable with other pots in a nested fashion so that multiple pots can be carried into the field using minimal space. The pot has a large opening at one end and gradually tapers in size towards the opposite end forming a deep cavity, so that even during the day the cavity offers a relatively dark hideaway for mosquitoes. During the collection process, the pot is designed to be immobile and is sized to attract mosquitoes for resting. The pot 12 is coupled to a pipe member 14 having a fan 16 mounted therein. A battery or battery pack 22 is removably coupled to the fan 16 via a wire coupler 24. A rain guard 26 is mounted to the pipe member 14 at an end opposite the pot 12 using L-shaped brackets 28 that maintain the rain guard 26 in spaced relation to the pipe member 14. The rain guard 26 is desirably a large disk-shaped member, which can be sized not only for protecting the fan 16 from rain, but also for functioning as a support member or leg to suspend the fan 16 and pipe member 14 a predetermined distance above of the ground. In some embodiments, the rain guard 26 is sized to work in conjunction with the pot 12 to suspend the pipe 14 horizontally. For horizontal placement, the pot 12 acts as one leg and the rain guard 26 acts as an opposing leg to support the trap 10. The rain guard 26 can further include a hood 30, which is arcuate-shaped and mounted above the fan 16, and perpendicular to the disk, to provide the fan with further protection from the elements. In addition to acting like a leg to support the trap 10, the rain guard 26 can also be used as a mounting disk to secure the trap 10 vertically, such as in a tree with the pot 12 being placed at the lowest position. As shown in FIG. 1, the pipe member 14 may be formed of multiple sub-pipes 36, 38 that are connected together via a coupler 40. A bracket 42 is coupled to the pot 12 at a tapered end thereof. The bracket 42 is sized for receiving the pipe member 14 and has a threaded hole for receiving a screw 44 to secure the pipe to the pot 12. Although the pipe member 14 is shown as having an end that is flush with an inner surface of the pot 12, the pot can further slid onto the pipe member so that the pipe partially protrudes into the pot. At any desired relative position, the screw 44 can be secured to the pipe. The coupler 40 has a diameter slightly larger than the sub-pipes 36, 38 for receiving the sub-pipes with a snug fit. The coupler has threaded holes for receiving screws 46 to secure each sub-pipe 36, 38 to the coupler 40.

Figure 2:
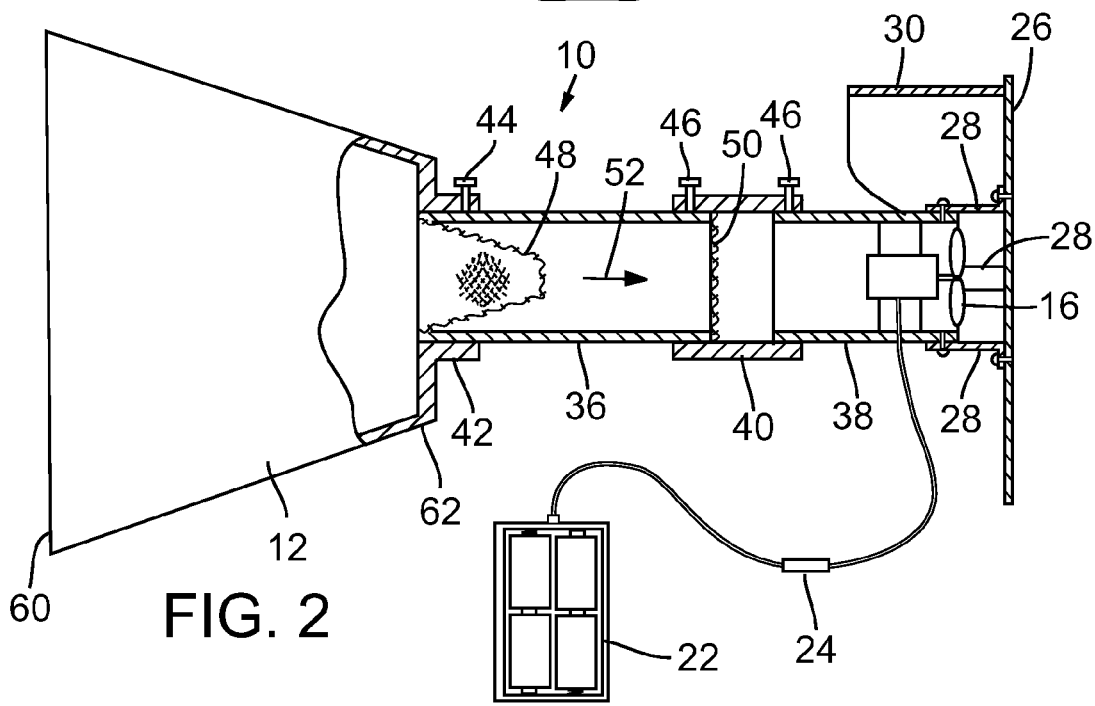
FIG. 2 is a cross-sectional view of the trap of FIG. 1.

FIG. 2 is a cross-sectional view of the trap 10. The bracket 42 can be secured to the pot 12 in a number of ways, such as by glue, screws, etc. The bracket 42 can take a variety of shapes and in the embodiment of FIG. 2 has a somewhat Z shape with a portion thereof secured to the pot 12 and a portion thereof sized to receive the pipe member 14. A frustoconical screen 48 can be mounted within the pipe member 14 with the base of thereof mounted adjacent to the pot 12. A screen 50 can also be mounted at the back end of sub-pipe 36 to form an enclosed collection chamber within the first sub-pipe 36. Both the frustoconical screen 48 and screen 50 have holes therein to allow the fan 16 to draw air in the direction of arrow 52 through the pipe member 14. Mosquitoes that are attracted to the resting pot 12 will therefore be aspirated through a hole in the pot 12 into the conical screen 48 and into the collection chamber formed in the sub-pipe 36. The mosquitoes are thereby trapped between the frustoconical screen 48 and the screen 50. The frustoconical screen has the advantage of making it easy to aspirate mosquitoes into the collection chamber, while making it difficult for mosquitoes to crawl out. Although the screen 50 is shown at the back end of the sub-pipe 36, it can also be mounted in the coupler 40 or any other desired location along the pipe member 14. The benefit of having the screen 50 in the sub-pipe 36 is that the collection chamber formed thereby can be easily removed from the trap 10 and a new collection chamber inserted. Desirably, the collection chamber formed in sub-pipe 36 can have lids (not shown) that can be mounted onto the sub-pipe 36 to maintain the captured mosquitoes therein. The frustoconical screen 48 can be removable in order to extract the mosquitoes from the collection chamber.

Figure 3:
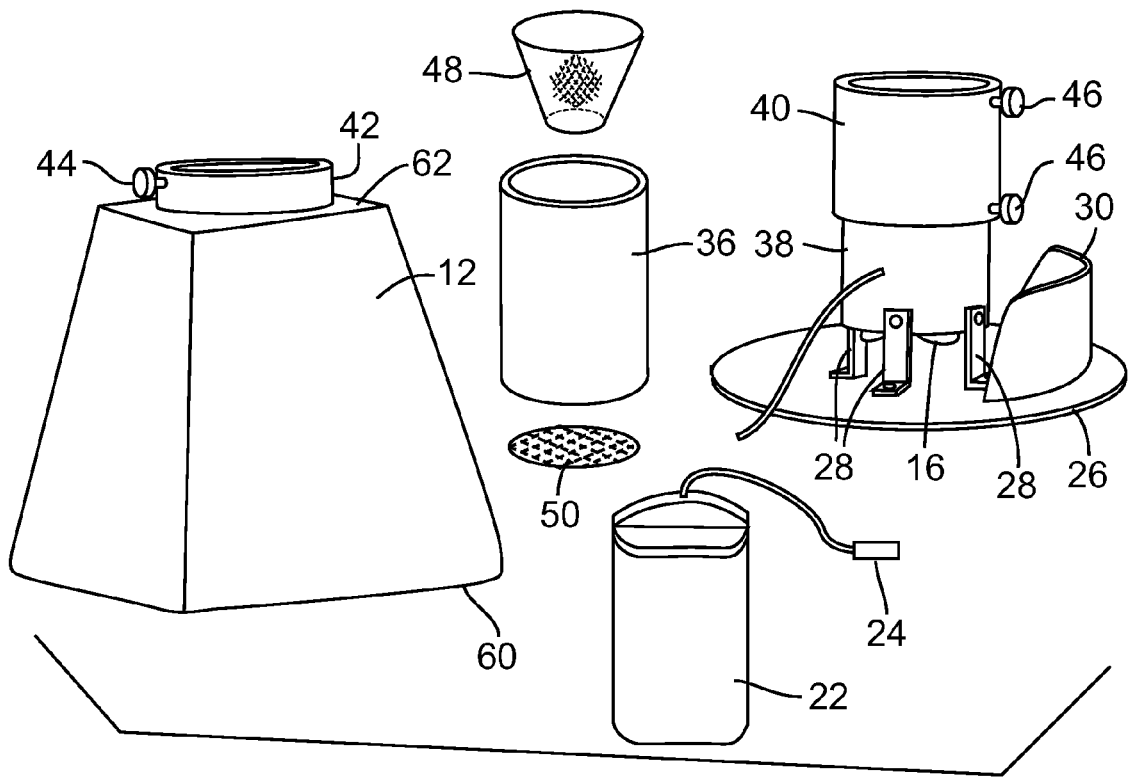
FIG. 3 is an exploded perspective view of the trap of FIG. 1.

FIG. 3 shows an exploded view of the different parts used in the trap 10. The trap can be disconnected so that it can be easily packed for transporting in and out of the field. Although the conical screen 48 and the screen 50 are both shown as removable, either one or both of these screens may be permanently mounted in the pipe member 14 (e.g., such as by using glue or a snap fit), if desired.

Figure 4:
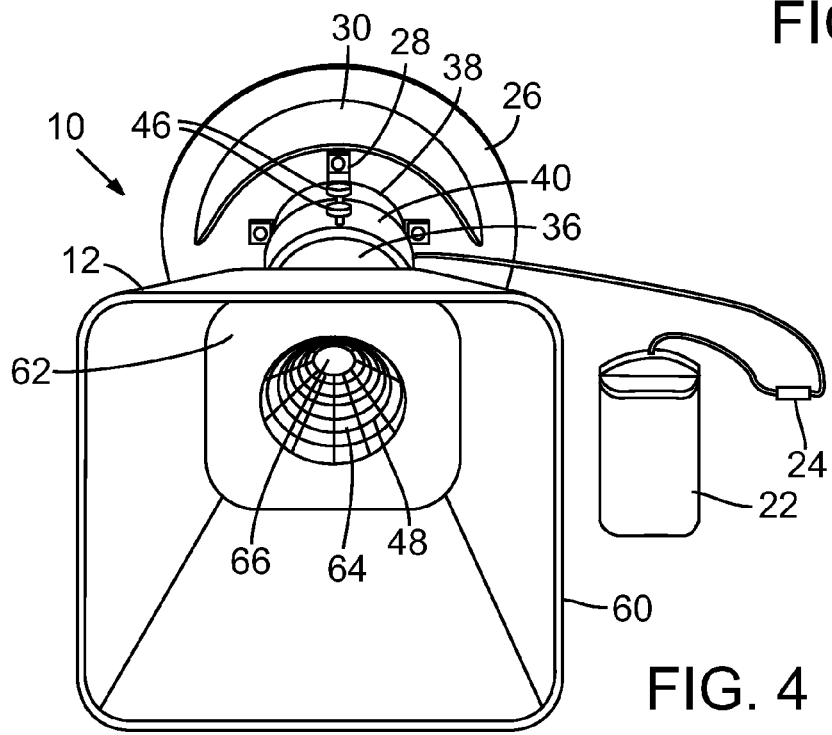
FIG. 4 is a frontal perspective view of the trap of FIG. 1.

FIG. 4 is a frontal view of the trap 10 showing that the pot 12 has an enlarged open end 60 and a smaller end 62 with a gradual tapering there between. The smaller end 62 has a hole 64 centrally located through which the mosquitoes are aspirated. The frustoconical screen 48 also has a hole 66 at a tapered end thereof, through which the mosquitoes are aspirated into the collection chamber. The inside of the resting pot 12 can be painted dark colors, such as black, in order to attract the mosquitoes to the dark area.

Figure 5:
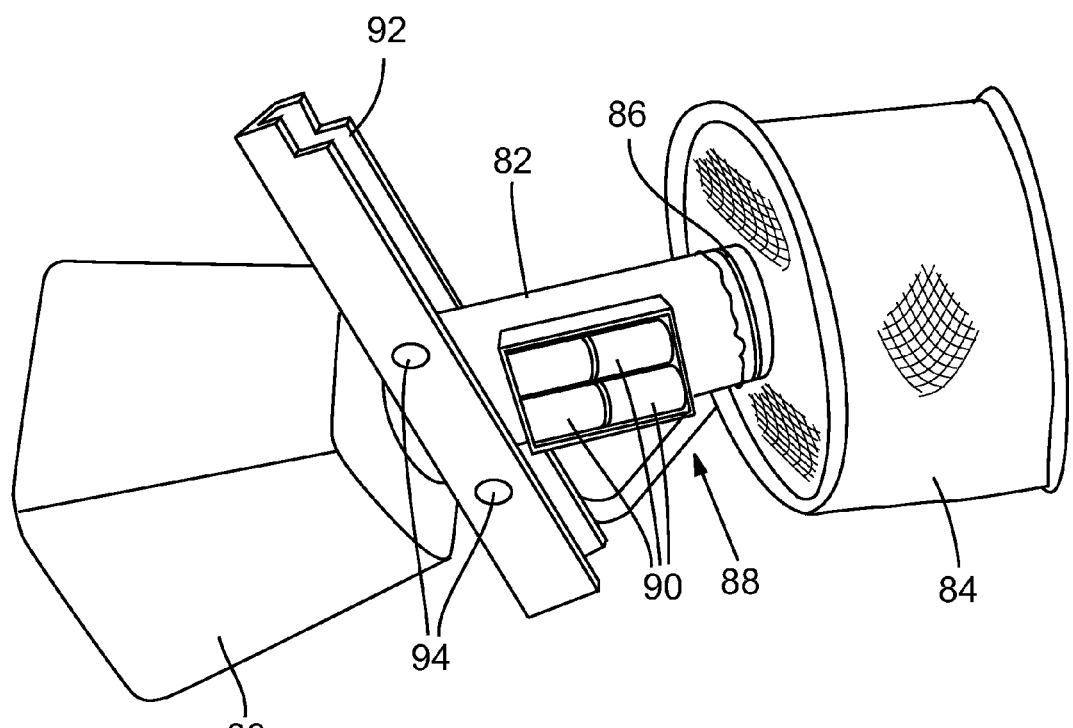
FIG. 5 is a perspective view of another embodiment for collecting resting mosquitoes.

FIG. 5 shows an alternative embodiment of the trap having a resting pot 80 coupled to a pipe or tube 82 and a net 84 secured to the pipe 82 using an elastic band 86. A battery pack 88 is mounted to the pipe 82 and houses batteries 90 for powering a fan (not shown) mounted within the pipe 82. Two wooden legs 92 are secured by bolts 94 and have mating holes sized for receiving and mounting the pipe 82 with a snug fit. The legs 92 are used to maintain the trap at a fixed distance from the ground. In this embodiment, the mosquitoes are aspirated through the fan, which can potentially damage the mosquitoes. By contrast, in the embodiment of FIGS. 1-4, the mosquitoes are aspirated into a collection chamber without passing through the fan. Although the enclosure is shown as a net 84, other enclosures can be used, as is well understood in the art. In any event, the enclosure acts as a collection chamber in which the mosquitoes are maintained.

In either of the embodiments, the fan may be operated continuously or, alternatively, a timing circuit can be used for intermittent operation in order to conserve power. In any event, the fan creates suction in order to aspirate the mosquitoes. Additionally, although the trap is preferably used for mosquitoes, it may be used for capturing other insects as well.

We tested at least one embodiment described herein and found a large improvement in results. We compared the efficiency of the CDC resting trap to wood fiber pots at four study sites in Northern Colorado during August and September, 2008. All fiber pots in the study, including those used as part of the CDC resting traps, were painted flat black on the interior surfaces. Each of the sites was associated with a communal bird roost where we were able to compare how efficiently each trap type collected blood fed mosquitoes. In addition, we collected host-seeking mosquitoes with $CO_2$-baited CDC light traps to assess species composition at each site.

At each site, thirty to fifty wood fiber pots were set and collections were made using a back pack aspirator (John W. Hock Company, 7409 NW 23$^{rd}$ Ave, Gainesville, Fla. 32604) once per day. Four to ten CDC resting traps were deployed at each site concurrently in similar microhabitats and collection nets were picked up daily. Collected mosquitoes were identified and processed using dissecting microscopes on chill tables. Additionally, in a separate comparison evaluating trap placement, an equal number of CDC resting traps were placed in areas either shaded by shrubby vegetation or along buildings and fence lines to simulate two distinct habitat types.

To determine the differences in catch rates by trap type, we derived ratios from mixed-effects, Poisson regression model, adjusting for fixed species and random site and date effects. A t-test was used to compare collections derived from two placement strategies for *Culex pipiens* L. and *Cx. tarsalis* independently.

Eleven mosquito species were collected with the majority of mosquitoes, principally *Aedes vexans* (Meigen), captured in CDC light traps baited with $CO_2$, which are designed to attract host-seeking mosquitoes (Table 1). The wood fiber pots and the CDC resting traps collected mostly *Culex* species, with a greater proportion of engorged mosquitoes than the light traps. The novel CDC resting trap collected 15.1-fold (95% CI 6.0-37.9) more *Culex pipiens* and 5.4-fold (95% CI 3.7-7.8) more adult female *Culex tarsalis* mosquitoes per trap night than did the wood fiber pots when collections from the same location were compared. Placement of the CDC resting traps indicated that fence lines were more effective than shaded vegetation for collecting *Culex* mosquitoes. The traps placed along the fence collected 3.8-fold more *Cx. pipiens* (95% CI 2.3-5.3) and 4.9-fold *Cx. tarsalis* (95% CI 3.1-6.7) mosquitoes per collection (n=9) than those set in vegetation.

The objective of this investigation was to improve upon an already effective method of collecting resting female *Culex* mosquitoes. By modifying wood fiber pots we were able to increase our collections by about an order of magnitude for both species of *Culex* targeted. Wood fiber pots and CDC resting traps collected engorged mosquitoes in much greater proportions than CDC light traps, which was expected. However, the percentages of engorged *Cx. tarsalis* and *Cx. pipiens* collected in the pots and resting traps did not differ significantly.

Our preliminary observation that trap efficacy increases along fence lines relative to shaded vegetation can be explained by assuming that vegetation successfully competes for resting locations. Collections in homogeneous vegetated habitat were typically lower than collections from individual bushes in habitat with little overall natural vegetation.

Resting collections in general are far superior to other types of collections for acquiring blood engorged female mosquitoes. Collecting blooded female mosquitoes is a valuable tool for researchers evaluating host preferences of mosquitoes and pathogen transmission dynamics, and for mosquito control personnel interested in monitoring human biting rates among local mosquito populations. Modern polymerase chain reaction technology can now identify the blood-meal source to the species level among vertebrates, and forensic techniques can be used to determine the individual blood donors for anthropophilic vectors, such as *Aedes aegypti* (L.) (Kent 2009). Elucidating the role of vertebrate host species in zoonotic pathogen transmission ecologies is desirable for effective public health practice.

In summary, we present preliminary data demonstrating a more effective trap for collecting resting mosquitoes. We expect this trap to have widespread applicability in research and in public health and veterinary surveillance for certain mosquito populations and their pathogens, including arboviruses (e.g. West Nile virus, etc.) and mosquito-borne parasites, including the agents of filariasis (filarial nematodes) and malaria (*Plasmodium* species).

TABLE 1

Mean number of mosquitoes collected per trap-night by trap type (% blood-fed)

| Mosquito Species | CDC Light Trap n = 19 | Wood Fiber Pot n = 920 | CDC Resting Trap n = 115 |
|---|---|---|---|
| *Aedes vexans* (Meigen) | 129.1 (2.0) | 0.072 (4.5) | 0.219 (0.0) |
| *Culiseta inornata* (Williston) | 1.8 (0.0) | 0.023 (15.3) | 0.057 (28.6) |
| *Culex pipiens* L. | 2.6 (0.0) | 0.037 (47.1) | 0.848 (21.0) |
| *Culex restuans* Theobald | 0.1 (0.0) | 0.007 (57.1) | 0.057 (20.0) |
| *Culex tarsalis* Coq. | 45.5 (0.6) | 0.380 (13.3) | 2.18 (22.4) |
| *Aedes dorsalis* (Meigen) | 11.1 (0.5) | 0.004 (0.0) | 0.019 (50.0) |
| *Aedes melanimon* Dyar | 15.2 (0.0) | 0.018 (17.6) | 0.0 (0.0) |
| *Aedes trivittatus* (Coq.) | 1.3 (0.0) | 0.003 (0.0) | 0.5 (0.0) |
| *Aedes hendersoni* Cockerell | 0.2 (0.0) | 0.03 (0.0) | 0.0 (0.0) |
| *Culiseta incidens* (Thomson) | — | — | 0.021 (0.0) |
| *Culex salinarius* Coq. | — | — | 0.007 (0.0) | n, number of trap-nights

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. An apparatus for collecting resting mosquitoes, comprising:
   a pot configured to attract mosquitoes to rest within the pot, the pot comprising a first opening configured to allow mosquitoes to enter into the pot and rest on an inner surface of the pot, the pot further comprising a second opening opposite the first opening through which mosquitoes resting within the pot can be aspirated, wherein the first opening is larger than the second opening;
   a pipe member having a first end coupled to the second opening of the pot and a second end opposite the first end;
   a fan coupled within the pipe member for aspirating mosquitoes resting on the inner surface of the pot into the pipe member;
   a frustoconical-shaped perforated screen mounted within the pipe member between the first end of the pipe member and the fan, wherein the frustoconical-shaped perforated screen comprises an opening at a tapered end, wherein the opening allows mosquitoes to readily pass entirely through the frustoconical-shaped screen in the direction of air-flow, while the frustoconical-shaped perforated screen restricts mosquitoes from passing through the frustoconical-shaped screen in the direction opposite of air-flow;
   a support plate spaced from the second end of the pipe member;
   support brackets extending from the second end of the pipe member to the support plate; and
   a covering extending from the support plate in the direction of the first end of the pipe member, the covering being arched partially around the second end of the pipe member and spaced apart from the support brackets and from the second end of the pipe member;
   wherein the support plate is configured to mount the apparatus in a stationary position with the arched covering positioned over the second end of the pipe member to shield the second end of the pipe member from rain.

2. The apparatus of claim 1, wherein the fan is mounted adjacent the second end of the pipe member and further including a second perforated screen mounted in the pipe member between the fan and the frustoconical-shaped perforated screen to prevent mosquitoes from passing through the fan.

3. The apparatus of claim 1, wherein the pipe member includes first and second sub-pipes removably coupled together by a coupler with the frustoconical-shaped perforated screen mounted within the first sub-pipe for trapping mosquitoes therein and the fan mounted within the second sub-pipe, the first sub-pipe forming a collection chamber for containing the mosquitoes.

4. The apparatus of claim 3, wherein the first and second sub-pipes are removably coupled together by a coupler with a second perforated screen mounted within the coupler and between the first and second sub-pipes for trapping mosquitoes between the second perforated screen and the frustoconical-shaped perforated screen.

5. The apparatus of claim 4, wherein the second perforated screen is positioned against an end of the first sub-pipe for blocking mosquitoes from exiting the first sub-pipe.

6. The apparatus of claim 3, wherein the coupler comprises a generally cylindrical shape having an inner diameter that is greater than an inner diameter of the first sub-pipe and that is greater than an inner diameter of the second sub-pipe.

7. The apparatus of claim 6, wherein the coupler comprises a first end portion that overlaps a portion of the first sub-pipe, and the coupler comprises a second end portion that overlaps a portion of the second sub-pipe, and wherein the coupler is readily detachable from both the first and second sub-pipes to access the collection chamber.

8. The apparatus of claim 1, wherein the support plate is configured for mounting the apparatus to a generally vertical surface with the pipe member in a generally horizontal orientation.

9. The apparatus of claim 1, wherein the pot is a fiber pot.

10. The apparatus of claim 1, wherein the inner surface of the pot has a dark color configured to attract mosquitoes to rest on the inner surface of pot.

11. The apparatus of claim 1, wherein the fan comprises fan blades that extend at least partially out of the second end of the pipe member.

12. The apparatus of claim 1, wherein the support brackets are generally "L" shaped having a first arm attached to the second end of the pipe member and a second arm attached to the support plate.

13. The apparatus of claim 1, wherein the pot comprises a rectangular cross-sectional shape.

14. The apparatus of claim 13:
    wherein the inner surface of the pot comprises a back surface facing the first opening of the pot and positioned around the second opening of the pot, wherein the back surface is generally planar and generally parallel to a plane defined by the first opening.

15. The apparatus of claim 1, wherein the inner surface of the pot comprises a back surface facing the first opening of the pot and positioned around the second opening of the pot, wherein the back surface is generally planar and generally parallel to a plane defined by the first opening.

16. The apparatus of claim 1, wherein a portion of the frustoconical-shaped perforated screen is positioned within the pot.

17. The apparatus of claim 1, wherein the support plate is configured to serve as a leg to support the apparatus on a resting surface and as a rain guard to shield the second end of the pipe member from falling rain.

18. The apparatus of claim 1, wherein the support plate is also configured to support the apparatus in a vertical position with support plate contacting an underlying support surface and the first opening of the pot facing upwardly.

19. The apparatus of claim 1, wherein the support plate is also configured to support the apparatus in a vertical position with the support plate being above the pipe member and the first opening of the pot facing downwardly.

\* \* \* \* \*